United States Patent
Gupta et al.

(10) Patent No.: US 11,562,735 B1
(45) Date of Patent: Jan. 24, 2023

(54) MULTI-MODAL SPOKEN LANGUAGE UNDERSTANDING SYSTEMS

(71) Applicant: Amazon Technologies, Inc., Seattle, WA (US)

(72) Inventors: Arshit Gupta, Seattle, WA (US); Julian E. S. Salazar, San Francisco, CA (US); Peng Zhang, Santa Clara, CA (US); Katrin Kirchhoff, Seattle, WA (US); Yi Zhang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 16/836,130

(22) Filed: Mar. 31, 2020

(51) Int. Cl.
*G10L 15/18* (2013.01)
*G10L 15/197* (2013.01)
*G10L 15/26* (2006.01)

(52) U.S. Cl.
CPC ........ *G10L 15/1815* (2013.01); *G10L 15/197* (2013.01); *G10L 15/26* (2013.01)

(58) Field of Classification Search
CPC .... G10L 15/1815; G10L 15/197; G10L 15/26
See application file for complete search history.

(56) References Cited

U.S. PATENT DOCUMENTS

| 9,401,140 B1 * | 7/2016 | Weber | G10L 15/00 |
| 2019/0333500 A1 * | 10/2019 | Kim | G06F 40/30 |
| 2020/0142889 A1 * | 5/2020 | Yadav | G06F 16/9035 |
| 2021/0065017 A1 * | 3/2021 | Ramnani | G06N 5/04 |
| 2021/0225357 A1 * | 7/2021 | Zhao | G06F 40/30 |

OTHER PUBLICATIONS

Mikel Artetxe, Gorka Labaka & Eneko Agirre, Unsupervised Neural Machine Translation, Feb. 26, 2018, conference paper at ICLR 2018, arXiv:1710.11041v2 [cs.CL] (Year: 2018).*
Chia-Hsuan Li, et al., "Spoken SQuAD: A Study of Mitigating the Impact of Speech Recognition Errors on Listening Comprehension", arXiv:1804.00320v1, Apr. 1, 2018, pp. 1-5.
Chia-Hsuan Lee, et al., "ODSQA: Open-Domain Spoken Question Answering Dataset", arXiv:1808.02280v1, Aug. 7, 2018, pp. 1-8.

(Continued)

*Primary Examiner* — Bhavesh M Mehta
*Assistant Examiner* — Darioush Agahi
(74) *Attorney, Agent, or Firm* — S. Scott Foster; Kowert, Hood, Munyon, Rankin & Goetzel, P.C.

(57) ABSTRACT

A spoken language understanding (SLU) system may include an automatic speech recognizer (ASR), an audio feature extractor, an optional synchronizer and a language understanding module. The ASR may produce a first set of input data representing transcripts of utterances. The audio feature extractor may produce a second set of input data representing audio features of the utterances, in particular, non-transcript specific characteristics of the speaker in one or more portions the utterances. The two sets of input data may be provided for the language understanding module to predict intents and slot labels for the utterances. The SLU system may use the optional synchronizer to align the two sets of input data before providing them to the language understanding module.

20 Claims, 11 Drawing Sheets

(56) References Cited

OTHER PUBLICATIONS

Parisa Haghani, et al., "From Audio to Semantics: Approaches to End-to-End Spoken Language Understanding", arXiv:1809.019190v1, Sep. 24, 2018, pp. 1-7.
Dmitriy Serdyuk, et al., "Towards End-to-End Spoken Language Understanding", arXiv:1802.08395v1, Feb. 23, 2018, pp. 1-5.
Bryan McCann, et al., "The Natural Language Decathlon: Multitask Learning as Question Answering", arXiv:1806.08730v1, Jun. 20, 2018, pp. 1-23.
Arkira Fukui, et al., "Multimodal Compact Bilinear Pooling for Visual Question Answering and Visual Grounding", arXiv:1606.01847v3, Sep. 24, 2016, pp. 1-12.
Mohammad Soleymani, et al., "A survey of multimodal sentiment analysis",Image and Vision Computing, http://dx.doi.org/10.1016/j.imavis.2017.08.003, 2017, pp. 1-12.
Xiujun Li, et al., "End-to-End Task-Completion Neural Dialogue Systems", arXiv:1703.01008v4, Feb. 11, 2018, pp. 1-11.
Albert Haque, et al., "Audio-Liguistic Embeddings for Spoken Sentences", arXiv:1902.07817v1, Sep. 20, 2019, pp. 1-5.
Shaoshi Ling, et al., "Contextual Phonetic Pretraining for End-to-end Utterance-Level Language and Speaker Recognition", arXiv:1907.00457v1, Jun. 30, 2019, pp. 1-5.
Ramon Sanabria, et al., "How2: A Large-scale Dataset for Multimodal Language Understanding", arXiv:1811.00347v2, Dec. 7, 2018, pp. 1-12.
Arshit Gupta, et al., "Simple, Fast, Accurate Intent Classification and Slot Labeling for Goal-Oriented Dialogue Systems", arXiv:1903.08268v2, Jul. 7, 2019, pp. 1-10.
Rashmi Gangadharaiah, et al., "Joint Multiple Intent Detection and Slot Labeling for Goal-Oriented Dialog", in Proceedings of NAACL-HLT 2019, Jun. 2-Jun. 7, 2019, pp. 564-569.

\* cited by examiner

MULTI-MODAL SPOKEN LANGUAGE UNDERSTANDING SYSTEMS

BACKGROUND

In dialog systems, spoken language understanding (SLU) is responsible for identifying a speaker's request and creating a semantic frame that succinctly summarizes the speaker's needs. These semantic frames are typically constructed using intents and slot labels. A SLU system may involve an automatic speech recognizer (ASR) and a language understanding module. The ASR may transcribe the speaker's speech utterances into transcripts, which may then be fed to the language understanding module to predict intents and slot labels. The performance of the SLU heavily depends on the accuracy of the transcribing of the ASR. Errors in the upstream ASR may inevitably propagate to downstream and negatively impact the accuracy of the intent and slot label predictions. Alternatively, a SLU system may adopt an end-to-end model where a prediction is produced directly from speech utterances without the intermediate transcripts. However, it is generally challenging, if not infeasible, to perform slot labeling based on the end-to-end configuration. Thus, it is desirable for high-quality SLU systems capable to determine intents and slot labels based on speech utterances.

Figure 1:
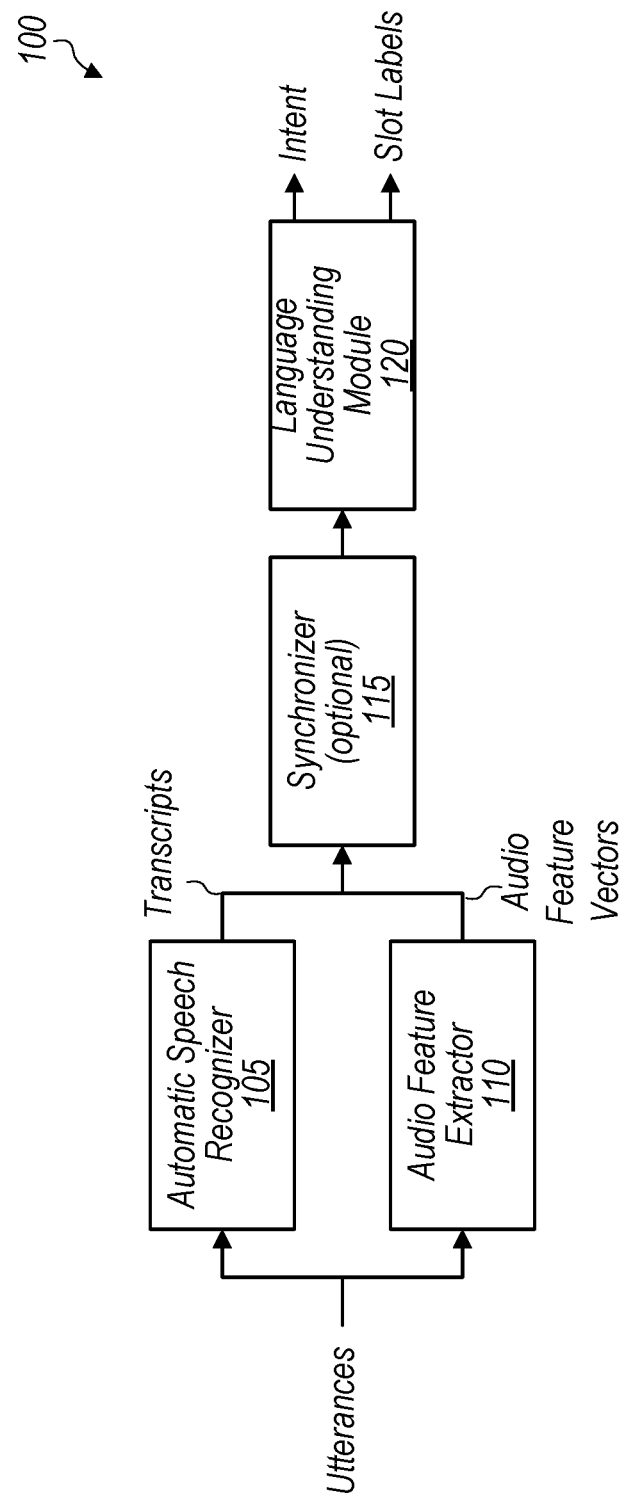
FIG. 1 is a block diagram showing an example spoken language understanding system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In spoken language analysis, an utterance is the smallest unit of speech. In the case of oral languages, it may be a continuous piece of speech including a sequence of words that begins and ends with a pause, e.g., silence. In dialog systems, spoken language understanding (SLU) is responsible for identifying a speaker's request based on speech utterances and creating a semantic frame that succinctly summarizes the speaker's needs. These semantic frames are typically constructed using intents and slot labels. The intent may capture the intention of the speaker (e.g., an action that the speaker wants to perform), whilst the slot labels may represent additional parameters or semantic components that the intent may require to fulfil the speaker's request. For instance, as to an utterance such as "How is the weather in Dallas?", the SLU system may need to identify the intent "GetWeatherInfo" and values for the slot labels, here, "City" (value="Dallas"). It is crucial that intents and slot labels are identified with high accuracy to develop high-quality dialog systems.

Various techniques for a multi-modal SLU system are described in this disclosure. In some embodiments, the SLU system may include an ASR configured to transcribe speech utterances into transcripts and an audio feature extractor configured to produce audio feature vectors of the speech utterances. The SLU system may feed both the transcripts and the audio feature vectors, as two streams of input data, to a language understanding module to determine intents and slot labels for the speech utterances. In some embodiments, the audio feature extractor may be trained to generate the audio feature vectors to capture non-transcript specific characteristics associated with the utterances. For instance, the audio feature vectors may comprise information indicating the emotion, tone, pitch etc. of the speaker in one or more portions of the utterances which may be ignored by the ASR or not be captured in the transcripts. Thus, the two streams of input data representing different aspects of the utterances based on ASR and audio feature extractors (i.e., multi-modal) may compensate each other and provide more comprehensive information of the speaker to improve the prediction performance of the language understanding module.

In some embodiments, the multi-modal SLU system may implement various privacy or other permissions-based controls for performing feature extraction or other utterance analysis as part of the implemented spoken language understanding techniques. Extraction of some (or all) features may, for instance, be restricted from the utterance without first determining that a speaker's permission (e.g., a user opt-in) has been granted. In this way, the multi-modal SLU system may allow for a speaker to control the types of analysis that are performed. For example, received audio files may be marked, flagged, or otherwise indicate permissions for the kinds of analysis to be performed. In this way, client applications that rely upon the multi-modal SLU system can specify the types of analyses that are (or are not) to be performed, in some embodiments. Moreover, such applications can provide a guarantee to speakers of the types of analysis that will (or will) not be performed.

In some embodiments, the SLU system may further include a synchronizer that is configured to align the transcripts from the ASR with the audio feature vectors from the audio feature extractor. In some embodiments, the synchronizer may add tokens respectively to the transcripts and audio feature vectors, and based on the tokens, pair individual ones of the transcripts with individual ones of the audio feature vectors corresponding to the same word or sentence of the speech. The token may, for instance, include a number, a character, or both. In some embodiments, the SLU may concatenate the aligned individual ones of transcripts and audio feature vectors to produce combined input data and provide the combined input data for the language understanding module to predict the intents and slot labels. In some embodiments, the SLU system may not have to include a synchronizer. Instead, the SLU may provide the transcripts from the ASR and the audio feature vectors from the audio feature extractor separately for the language understanding module. For instance, the SLU may first provide the transcripts to the language understanding module to predict coarse intents and slot labels. The SLU may further provide the audio feature vectors to the language understanding module to modify or fine-tune the coarse predictions to produce the final intent and slot label predictions.

In some embodiments, some or all of the ASR, audio feature extractor and language understanding module may comprise various artificial intelligence and machine learning models. For instance, they may include feedforward artificial neural network (ANN) models, deep learning neural network models (e.g., recurrent neural network (RNN) models, long short-term memory (LSTM) models, or convolutional neural network (CNN) models), encoder-decoder models, support vector machines (SVMs), Markov models, logistic regression models, and the like. In some embodiments, the individual components of the SLU system may be trained independently or jointly. For instance, the ASR, audio feature extractor and language understanding module may first be trained separately with individual training datasets, and then trained altogether jointly. Alternatively, the components may all be trained together with same training datasets.

FIG. 1 shows an example SLU system, according to some embodiments. As shown in FIG. 1, SLU system 100 may include automatic speech recognizer (ASR) 105, audio feature extractor 110, synchronizer 115 that is an optional component, and language understanding module 120. In some embodiments, ASR 105 may receive utterances, e.g., from audio files, video files, or audio data (e.g., .m4a, mp4, .wav, .mp3 files, etc.) recorded by sound recording instruments such as microphones or recorders, and transcribe the utterances to transcripts according to the utterances. In embodiments, the utterances may be also fed to audio feature extractor 110 that may produce audio feature vectors representing audio features of the utterances. In particular, the audio feature vectors may comprise non-transcript specific characteristics associated with the utterances. For instance, the audio feature vectors may include information indicating the emotion, tone, pitch etc. of the speaker in one or more portions of the utterances which may be ignored by the ASR or not be captured in the transcripts. This allows the two sets of input data (one representing the transcripts and the other representing the audio features of the utterances) to compensate each other to provide comprehensive information for language understanding module 120 to make accurate predictions. In some embodiments, SLU 100 may feed the two streams of input data—one from ASR 105 representing the transcripts of the utterances and the other from audio feature extractor 110 representing audio features of the utterances—to language understanding module 120 through synchronizer 115. In some embodiments, synchronizer 115 may align individual ones of the first stream of input data with individual ones of the second stream of input data that correspond to the same word or sentence (or utterance) of the speech and produce combined input data based on the synchronized input data for the corresponding portion of the speech. In some embodiments, the alignment may be performed by using tokens. For instance, synchronizer 115 may assign a first set of tokens to the first stream of input data from ASR 105 representing the transcripts and a second set of tokens to the second stream of input data from audio feature extractor 110 representing the audio features, and determine the alignment between the two streams of input data based on the first and second sets of tokens. In some embodiments, the alignment may be performed word-by-word, for instance, pairing an input data representing a word of the transcript with an input data representing the audio features of the same word. In some embodiments, the alignment may be established on the sentence level, for instance, aligning one or more input data representing a sentence or utterance of the transcript with one or more input data representing the audio features of the same sentence or utterance. Synchronizer 115 may concatenate the aligned input data to create combined input data and provide the combined input data for language understanding module 120 to provide intents and slot labels for the utterances. In some embodiments, SLU 110 may not have to include synchronizer 115—i.e., synchronizer 115 becomes an optional module. In that case, SLU 110 may provide the two streams of input data from ASR 105 and audio feature extractor 110 separately to language understanding module 120. For instance, SLU may feed the first set of input data from ASR 105 representing the transcripts of the utterances to language understanding module 120 to make coarse predictions of the intents and slot labels for the utterances. SLU may further provide the second set of input data from audio feature extractor 110 representing the audio features of the utterances to language understanding module 120 to adjust the coarse predictions and determine the final intents and slot labels. Besides what is described above, the transcripts and audio features may be fed to language understanding module 120 in various fashions, according to some embodiments. For instance, the two streams of input data may be taken by language understanding module 120 in a random sequence. In some other embodiments, one or more portions of the transcripts may be provided to language understanding module 120, in a specific order, with one or more portions of the audio features, whilst the rest of the transcripts and audio features may be taken randomly. What is more important is that in training and testing, language understanding module 120 utilizes both sets of input data to predict the intents and slot labels.

Figure 2:
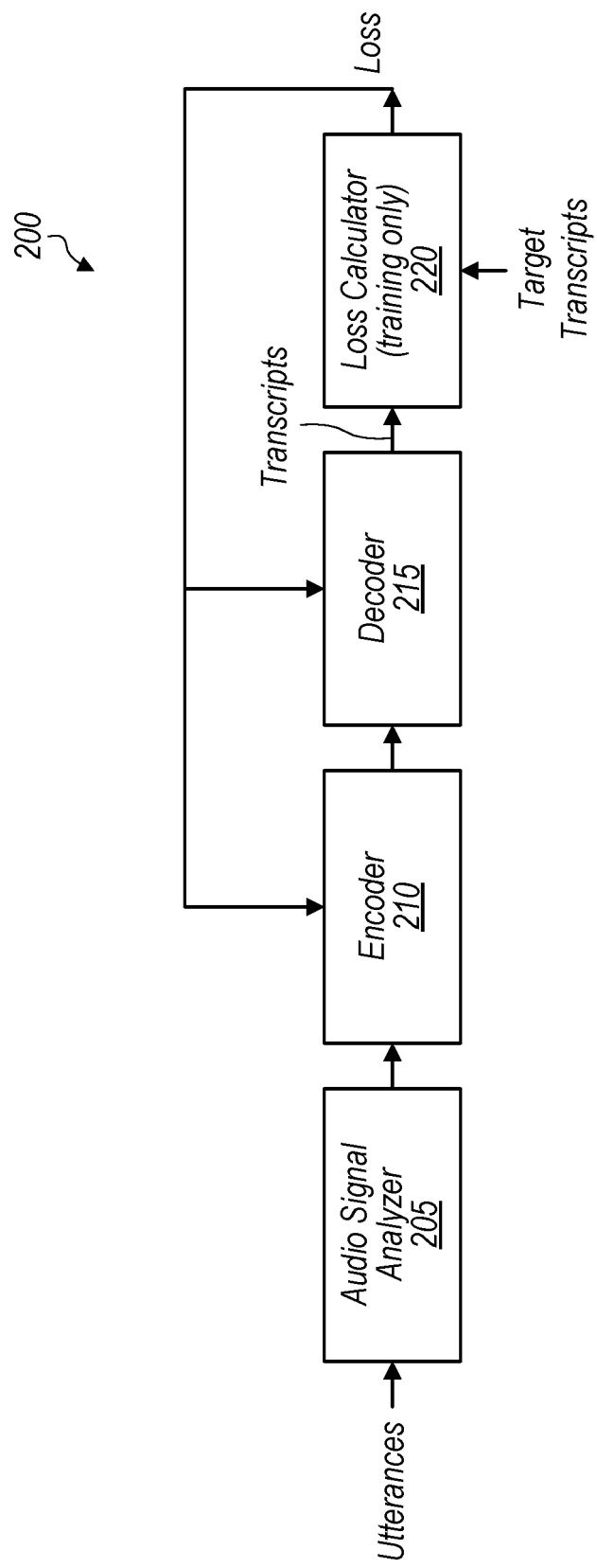
FIG. 2 is a block diagram showing an example automatic speech recognizer, according to some embodiments.

FIG. 2 shows an example ASR (e.g., ASR 105 in FIG. 1), according to some embodiments. As described above, the ASR of the SLU system, such as ASR 105 of SLU 100 in FIG. 1, may be implemented based on various artificial intelligence and machine learning models, e.g., feedforward ANNs, RNNs, LSTMs, CNNs, and the like. For purposes of illustration, in this example, ASR 200 may comprise an encoder-decoder model. As shown in FIG. 2, ASR 200 may receive the utterances at audio signal analyzer 205. Audio signal analyzer 205 may process audio signal from the utterances to calculate various acoustic attributes, such as frequency, spectrum, energy, envelope, and/or time related coefficients. For instance, audio signal analyzer 205 may calculate Mel-Frequency cepstral coefficients (MFCC) of the utterances to create a log-Mel cepstrum of the utterances. In some embodiments, audio signal analyzer 205 may perform perceptual linear prediction (PLP) or a combination of MFCC and PLP on audio signal of the utterances. In some embodiments, ASR 200 may include encoder 210 and decoder 215 to produce data representing transcripts of the utterances based on the acoustic attributes from audio signal analyzer 205. Encoder 210 may take the input data (generally higher-dimensional), such as acoustic attributes from audio signal analyzer 205, and generate an internal representation (or embedding vectors, generally lower-dimensional vectors). Decoder 215 may take the internal representation (or embedding vectors) from encoder 210 and produce an output prediction, e.g., transcripts of the input utterances. In other words, encoder 210 may compress the input data to a lower-dimensional feature representation, whilst decoder 215 may decompress the feature representation back into the higher-dimensional input data space. ASR 200 may further include loss calculator 220 for training of ASE 200. Loss calculator 220 may compare the transcripts from decoder 215 with target transcripts of the input utterances that are provided as part of the training dataset to determine loss(es). The target transcripts refer to reference transcripts that ASR 200 is expected to transcribe. ASR 200 may use the loss(es) to train encoder 210 and decoder 215, e.g., by updating the parameters of encoder 210 and decoder 215 with gradient decent based backpropagation algorithms. Once trained, ASR 200 may be deployed to testing with audio signal analyzer 205, encoder 210 and decoder 215 to transcribe utterances into data representing transcripts of the utterances.

Figure 3:
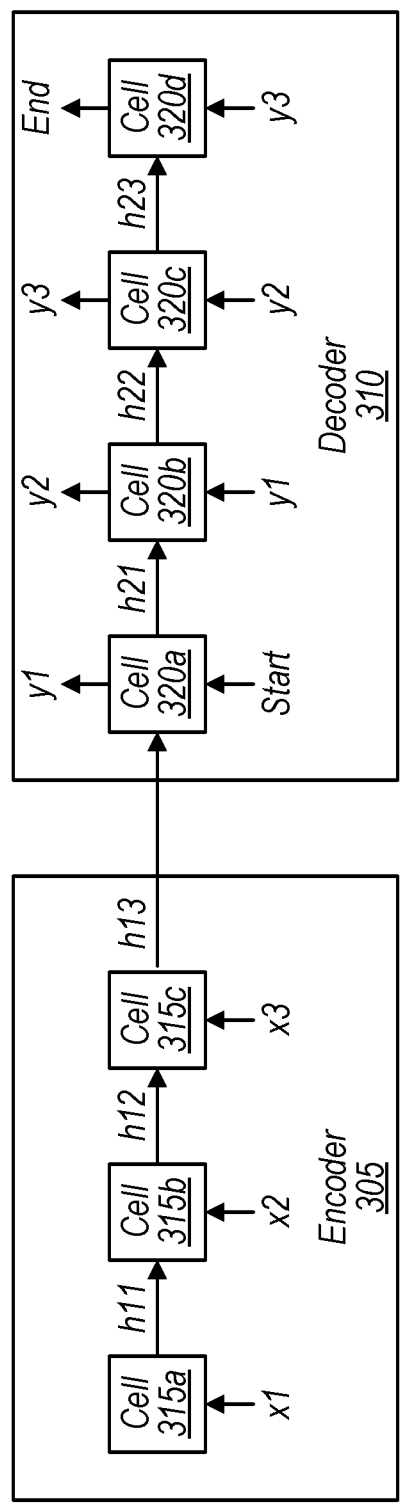
FIG. 3 is a block diagram showing an example encoder-decoder model, according to some embodiments.

FIG. 3 shows an example encoder-decoder model, according to some embodiments. The encoder and decoder shown here may be applied to develop the ASR, audio signal extractor and language understanding module of the SLU system described in this disclosure. As described above, the encoder and decoder generally work in opposite directions. The encoder may take an input and compress features of the input into a lower-dimensional intermediate representation (or embedding vectors), whilst the decoder may decompress the features of the intermediate representation (or embedding vectors) to generate an output prediction. In some embodiments, the encoder-decoder system may be implemented based on two long short-term memory (LSTM) models, as shown in FIG. 3. In this example, encoder 305 may include three cells 315*a*-315*b*, and decoder 310 may have five cells 320*a*-320*e*. Each of cells 315*a*-3115*b* and 320*a*-320*d* may take an input, such as x1-x3 and y1-y3 and generate respective output and hidden states. In spoken language analysis, the semantics of a word in an utterance heavily depends on the context of the word, such as words adjacent to the specific word. A LSTM model may capture the temporal context information by passing a hidden state from one cell to another. For instance, as shown in FIG. 3, cells 315*a*-315*c* may take a sequence of input x1-x3, e.g., acoustic attributes of utterances, as input and generate respective hidden states h11-h13. For instance, if the utterance is "How are you?", the acoustic attributes of the first word "How" may be fed to cell 315*a* to produce hidden state h11. Cell 315*a* may pass the hidden state h11 to cell 315*b* that may, in turn, generate hidden state h12 based on acoustic attributes of the second word "are" together with the hidden state h11. Cell 315*b* may pass the hidden state h13 to cell 315*c* that may, in turn, create hidden state h13 based on acoustic attributes of the third word "you" and the hidden state h12. Thus, the hidden states h11-h13 may temporally pass the historical information, from one cell to another, that encoder 305 sees over time. The final hidden state h13 may contain representative information about the entire input sequence seen by encoder 305 to assist downstream decoder 310 to make predictions. For purposes of illustration, FIG. 3 illustration to implement the encoder-decoder model based on LSTM networks. In some embodiments, the encoder and/or decoder may be implemented based on various artificial intelligence and machine learning techniques, e.g., feedforward neural networks, RNN, CNN, SVM, etc.

As described above, the task of decoder 310 may produce predictions, such as the transcript "How are you?". As shown in FIG. 3, cells 320*a*-320*d* of decoder 310 may pass hidden states from one cell to another, like cells 315*a*-315*c* of encoder 305. Further, cells 320*a*-320*d* may take the output from respective precedent cells, together with the passed hidden state, to generate the new output. For instance, cell 320*a* may be trained to produce output y1 that transcribes the first word (e.g., y1="How"). Cell 320*b* may take the output of cell 320*a* (e.g., y1="How") as input to predict the next word y2 of the transcript (e.g., y2="are") based on hidden state h21 and output y1 from cell 320*a*. Similarly, cell 320*c* may take the output of cell 320*b* (e.g., y2="are") as input the predict the next word y3 of the transcript (e.g., y3="you") based on hidden state h22 and output y2 from cell 320*b*; until last cell 320*d* of decoder 310. In some embodiments, the input sequence to cells 320*a*-320*d* of decoder 310 may include special tokens (e.g., "Start" and "End") that are added to the beginning and end of the sequence during training to signify the completeness of the sequence. To summarize, in this example, encoder 305 may take an utterance "How are you?" as input and generate an intermediate representation (or embedding vectors), e.g., the hidden state h13, while decoder 310 may take the intermediate representation (or embedding vectors), e.g., the hidden state h13, and produce an transcript "How are you?" (e.g., y1-y3) for the utterance. Note that the LSTM models shown in FIG. 3 is merely one example to implement encoders and decoders, for purposes of illustration. In some embodiments, encoders and decoders in the ASR, audio feature extractor and language understanding module of the SLU system disclosed herein may be implemented in various artificial intelligent and machine learning models, including but not limited to, feedforward ANNs, RNNs, CNNs, SVMs, etc.

Figure 4:
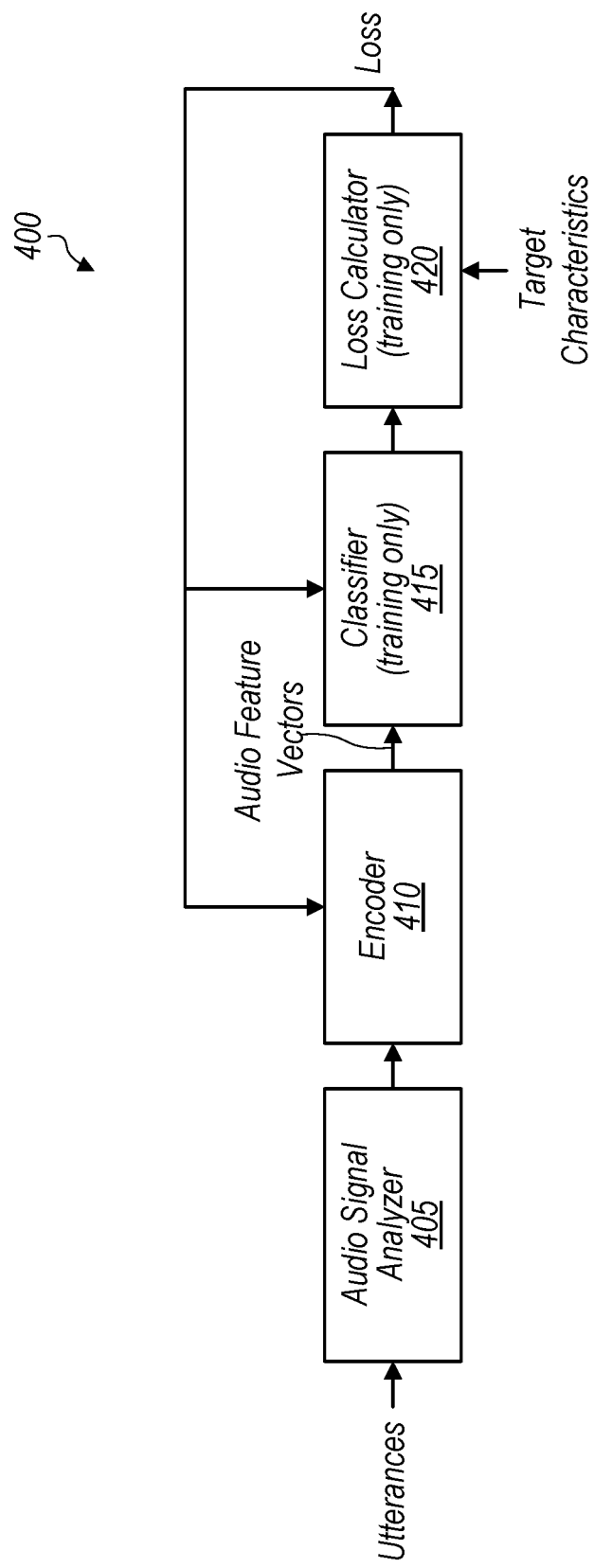
FIG. 4 is a block diagram showing an example audio feature extractor, according to some embodiments.

FIG. 4 shows an example audio feature extractor (e.g., audio feature extractor 110 in FIG. 1), according to some embodiments. As shown in FIG. 4, audio feature extractor 400 may include audio signal analyzer 405, encoder 410, classifier 415 and loss calculator 410. In some embodiments, audio signal analyzer 405 may receive utterance of speech, e.g., from audio files or audio data and calculate various acoustic variables associated with the utterances, similar to audio signal analyzer 205 in FIG. 2. For instance, audio signal analyzer 205 may calculate acoustic attributes for the utterances based on MCFF, PLP or other audio signal processing algorithms. Encoder 410 may take the calculated acoustic variables from audio signal analyzer 405 to determine a representation (or embedding vectors) that represent the audio features of the utterances (hereinafter "audio feature vectors"). As described above, encoder 401, such as those based on LSTM described above in FIG. 3, may compress the features in the input (e.g., acoustic attributes of the utterances from audio signal analyzer 405) into the audio feature vectors. In other words, the audio feature vectors may be considered a representation of the audio features in a lower-dimension space. Generally, the embedding vectors may be fixed-length, e.g., n-dimensional, vectors of variables that are in machine-friendly formats for processing by computing devices. For purposes of illustration, encoder 410 may be built based on LSTM models, such as encoder 305 in FIG. 3. In some embodiments, audio feature extractor 400 may include classifier 415 and loss calculator 420 for training of audio feature extractor 400. Classifier 415 may take the audio feature vectors generated from encoder 410 to make one or more predictions. In some embodiments, the predictions from classifier 410 may be non-transcript specific characteristics associated with the utterances. For instance, classifier 415 may predict the emotion, tone, pitch, etc. of the speaker in one or more portions of the utterances which may be ignored by the ASR or not be captured in the transcripts. In some embodiments, classifier 415 may comprise a fully connected layer having a set of neurons each of which may be connected to all representations produced in the previous layer (e.g., encoder 410) through weighted connections, as seen in regular feedforward artificial neural networks. Thus, encoder 410 together with classifier 415 may be considered analogous to an ANN model, and the audio feature vectors may be treated as the output of the last hidden layer of the ANN model. The prediction(s) from classifier 415 may be provided for loss calculator 420 to calculate loss(es). For instance, loss calculator 420 may compare the prediction(s) with one or more target characteristics associated with the speaker, which audio feature extractor 400 is expected to predict or capture and then produce the loss(es). The loss(es) may further be used to train encoder 410, e.g., by updating the parameters of encoder 410 with gradient decent based backpropagation algorithms. Once trained, audio feature extractor 400 may be deployed to testing with audio signal analyzer 405 and encoder 410 to produce output data, such as the audio feature vectors, that represent the audio features of the utterances. For purposes of illustration, in the example shown in FIG. 4, audio feature extractor 400 includes dedicated audio signal analyzer 405 and encoder 410. In some embodiments, audio features extractor 400 may share the audio signal analyzer and/or encoder with the automatic speech recognizer (e.g., ASR 100 and 200 in FIGS. 1-2). For instance, in FIG. 1, ASR 105 and audio feature extractor 110 may use the same audio signal analyzer (e.g., audio signal analyzer 205 in FIG. 2) to calculate the acoustic attributes of the utterances. In some embodiments, ASR 105 and audio feature extractor 110 may further share an encoder (e.g., encoder 210 in FIG. 2) to implement the signal encoding process.

Figure 5:
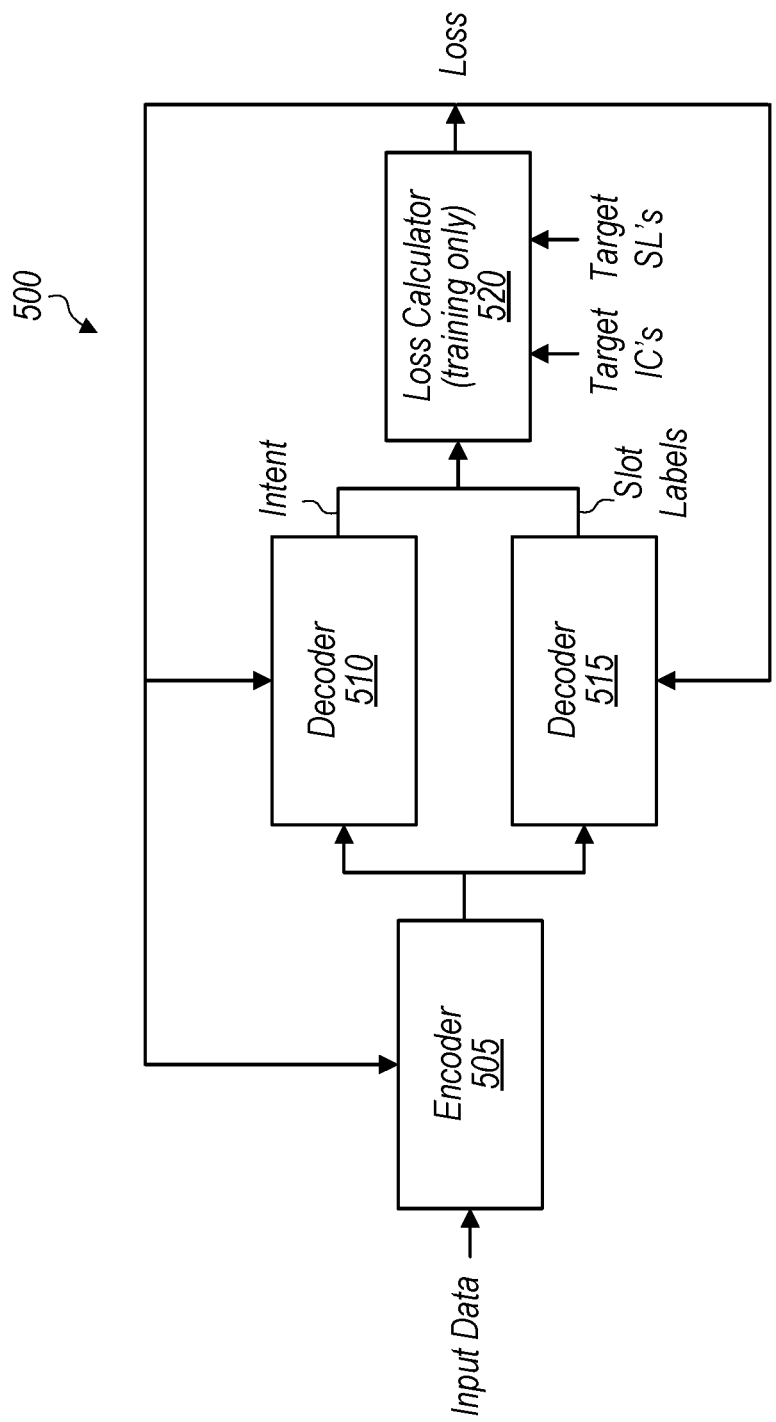
FIG. 5 is a block diagram showing an example language understanding module, according to some embodiments.

As described above, the job of the language understanding module is to predict intents and slot labels associated with the intents for the utterances of speech. Generally, intent classification may be modeled as a sentence classification task where an intent is assigned to one sentence or utterance of a speaker's speech. Referring back to the early example utterance "How is the weather in Dallas?", the intent may be detected for the entire sentence as "GetWeatherInfo." Slot labeling may be modeled as a sequential labeling problem, where the words $x_1, x_2, \ldots x_n$ in a speaker's utterance may be individually labeled with respective slot labels. In the example above, the sequence of slot labels may be "O O O O O City O", where "City" is the slot label for "Dallas" associated with the intent "GetWeatherInfo" for the example utterance and "O" stands for "Other" or a default/non-specific slot label. Sequential models such as maximum entropy Markov models and conditional random fields may be used for slot labeling, while intent prediction may be performed based on classification approaches such as SVM. For purposes of illustration, FIG. 5 shows an example language understanding module (e.g., language understanding module 120 in FIG. 1) based on ANN-based encoder-decoder models, according to some embodiments. In this example, language understanding module 500 may include encoder 505, which may generate intermediate representations, based on input data, respectively for decoders 510 and 520 to predict intents and slot labels. As for the SLU system disclosed herein, the input data to encoder 505 may include two sets of input data respectively from the ASR (e.g., ASR 105/200 in FIGS. 1-2) and audio feature extractor (e.g., audio feature extractor 110/400 in FIGS. 1 and 4). The first set of input data may represent transcripts of utterances of a speaker's speech, whilst the second set of input data may represent audio features of the utterances. In some embodiments, the audio features may comprise non-transcript specific characteristics associated with the utterances, e.g., the emotion, tone, pitch, etc. of the speaker in one or more portions of the utterances. In some embodiments, encoder 505 and decoders 510-515 may comprise LSTM models, e.g., LSTM encoder-decoder 305-310 in FIG. 3. In some embodiments, language understanding module may further include loss calculator 520 for purposes of training of language understanding module 500. For instance, loss calculator 520 may compare the predicted intents and slot labels, respectively from decoders 510 and 520, with target intents and slot labels that are provided as part of the training dataset to calculate loss(es). The loss(es) may be further used to train encoder 505 and decoders 510-515, e.g., by updating the parameters of encoder 505 and decoder 510-515 with gradient decent based backpropagation algorithms. Once trained, language understanding module 500 may be applied to testing with encoder 505 and decoders 510-515 to determine intents and slot labels for utterances. Note that FIGS. 2-5 respectively describe operations, including training, of ASR 200, audio feature extractor 400 and language understanding module 500. However, these components may not have to be trained separately. As described above, some or all of these components may first be trained (or pre-trained) separately and then further trained (or fine-tuned) altogether jointly. Alternatively, all of the components may be trained jointly without separate pre-training. In this example in FIG. 5, language understanding module 500 may include decoder 510 and 515 respectively for intent classification and slot label prediction. In some embodiments, the predictions of the intents and slot labels may be combined and implemented with a same decoder.

Figure 6:
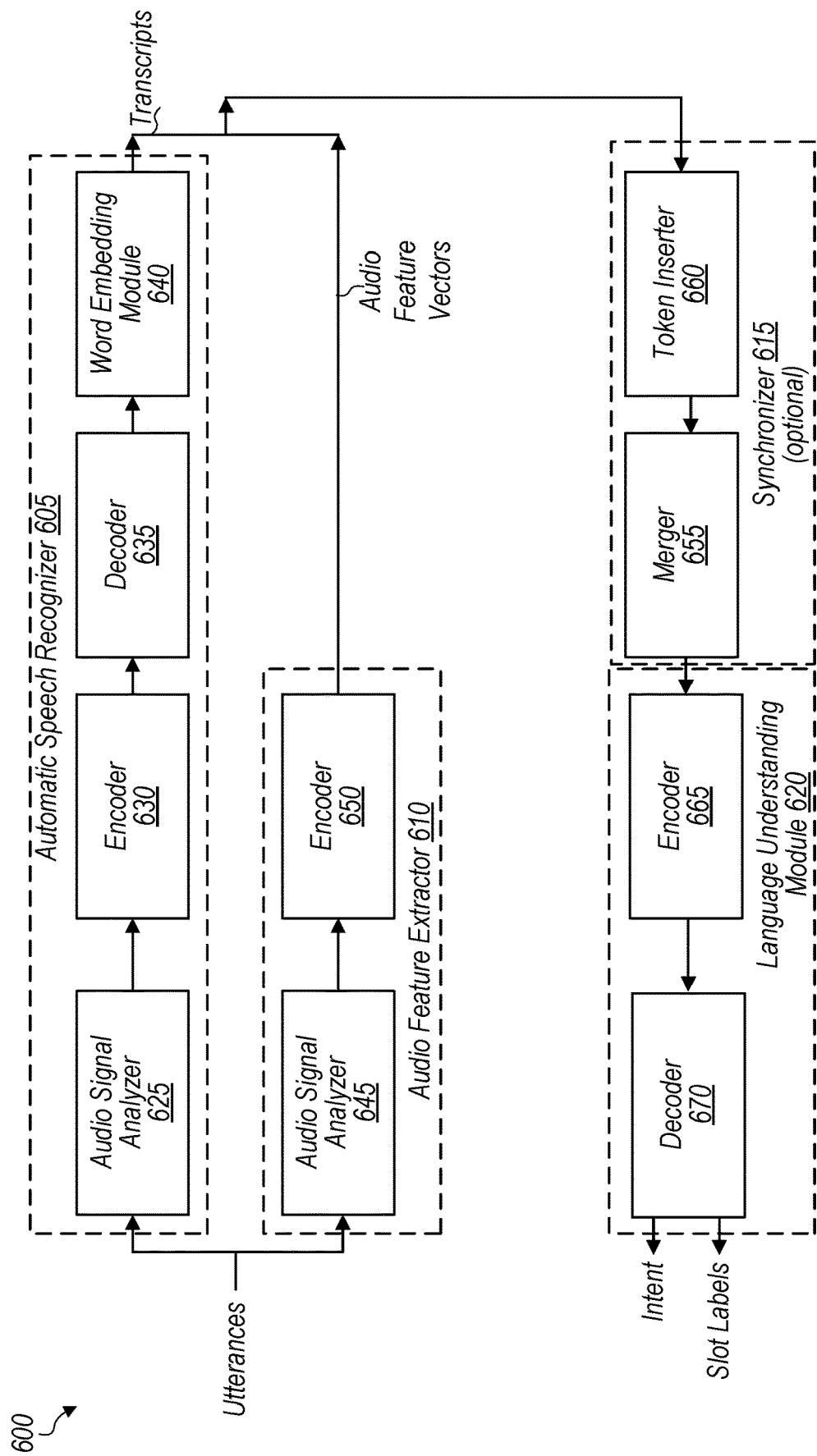
FIG. 6 is a block diagram showing an example spoken language understanding system, according to some embodiments.

FIG. 6 is a block diagram showing an example complete SLU system, according to some embodiments. In FIG. 6, SLU system 600 may include ASR 605, audio feature extractor 610, optional synchronizer 615, and language understanding module 620. Referring back to FIG. 2, ASR 605 may include audio signal analyzer 625, encoder 630, decoder 635 and word embedding module 640. Audio signal analyzer 625, encoder 630 and decoder 635 may act substantially similar to audio signal analyzer 205, encoder 210 and decoder 215 described above with regards to FIG. 2. For instance, audio signal analyzer 625 may create acoustic attributes based on audio signal of utterances. Encoder 630 and decoder 635 may produce transcripts of the utterances based on the acoustic attributes extracted from the audio signals. Word embedding module 640 may convert the transcripts into data, e.g., fixed-length vectors of variables, that represent the transcripts in machine-friendly formats for processing by computing devices. In some embodiments, word embedding module may perform the conversion based on various word embedding modules, e.g., Word2Vec or GloVe. Referring back to FIG. 4, audio feature extractor 610 may include audio signal analyzer 645 and encoder 650. Audio signal analyzer 645 and encoder 650 may operate substantially similar to audio signal analyzer 405 and encoder 410 described above in FIG. 4. For instance, audio signal analyzer 645 may calculate acoustic attributes based on audio signal of utterances. Encoder 650 may produce audio feature vectors representing the audio features of the utterances. In some embodiments, the audio feature vectors may comprise non-transcript specific characteristics associated with the utterances, such as the emotion, tone, pitch, etc. of the speaker in one or more utterances which may be ignored by ASR 605 or not be captured in the transcripts. This allows the two sets of input data to compensate each other to provide the comprehensive information for language understanding module 620 to provide accurate predictions. SLU 600 may take the output from ASR 605 and audio feature extractor 610 and provide the two set of input data to language understanding module 620, through synchronizer 615, to predict intents and slot labels for the input utterances. Synchronizer 615 may align individual ones of the first set of input data from ASR 605 (representing the transcripts of the utterances) with individual ones of the second set of input data from audio feature extractor 610 (representing the audio features of the utterances) to produce combined input data. In some embodiments, synchronizer 615 may perform the alignment by using token inserter 660. For instance, token inserter 660 may assign a first set of tokens to the first set of input data and a second set of tokens to the second set of input data. The tokens may include number, characters, or both, and they may label the input data in the two sets corresponding to specific words of an utterance or specific utterances of speech. Accordingly, synchronizer 615 may align the first and second sets of input data on word-by-word or sentence-by-sentence (or utterance-by-utterance). In some embodiments, synchronizer 615 may create combined input data based on the aligned first and second sets of input data. For instance, synchronizer 615 may include merger 655 that may concatenate a pair of aligned input data from the two sets which correspond to the same word or the same sentence to produce a combined input data for the word or sentence. SLU 600 may provide the combined input data to language understanding module 620 to perform the prediction. Referring back to FIG. 5, language understanding module 620 may include encoder 665 and decoder 670. As described above, language understanding module 620 may use one single decoder 670 (rather than separate encoders) to predict both intents and slot labels. Encoder 665 and decoder 670 may operate in a substantially similar manner as that of encoder 505 and decoders 510-515 as described above in FIG. 5 to predict intents and slot labels associated with the intents for the utterances. In some embodiments, synchronizer 615 may be an optional component of SLU 600. In that case, SLU 600 may simply provide the two sets of input data from ASR 605 and audio feature extractor 610 directly to language understanding 620. For instance, SLU 600 may provide the first set of input data from ASR 605 that represents the transcripts of the utterances for language understanding 620 to make coarse predictions of intents and slot labels. SLU 600 may further provide the second set of input data from audio feature extractor 610 that represents the audio features of the utterances for language understanding 620 to adjust or fine-tune the coarse predictions to provide the final intents and slot labels. Note that SLU 600 may provider the two sets of input data in alternative orders to language understanding module 620. For instance, SLU 600 may provider the second set of input data first and the second set of input data next to language understanding module 620. Alternatively, SLU 600 may mix the two sets of input data and provide a subset of the first (or second) set first and a subset of the second (or first) set of input data next to language understanding module 620. In some embodiments, it may not have to provide the two sets of input data to language understanding module 620 according to specific orders. Rather, what is more important is to allow language understanding module 620 to see both sets of input data to perform the predictions.

Figure 7:
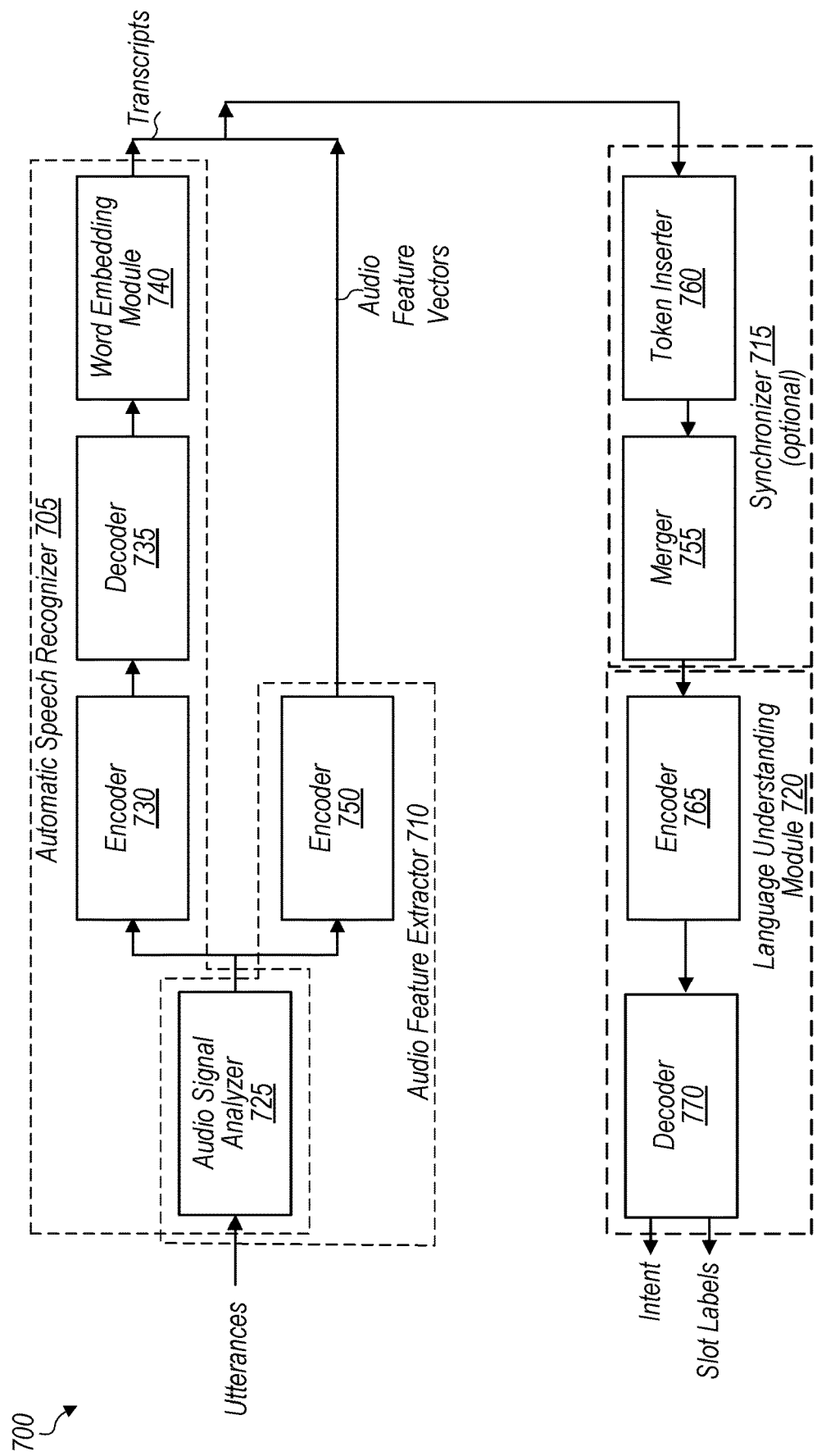
FIG. 7 is a block diagram showing another example spoken language understanding system, according to some embodiments.

FIG. 7 shows another example spoken language understanding system, according to some embodiments. As shown in FIG. 7, the structure of SLU 700 may be substantially similar to that of SLU 600, except that ASR 705 and audio feature extractor 710 may jointly share audio signal analyzer 725. As described above in FIGS. 2 and 4, both ASR 705 and audio feature extractor 710 may utilize audio signal analyzer 725 to calculate various acoustic attributes of the audio signal of the utterances, e.g., based on MFCC, PLP, and other acoustic signal analysis algorithms. However, ASR 705 and 710 may be trained to extract different information from the acoustic signal. For instance, ASR 707 may include encoder 730 and 735 trained to transcribe the utterances, whilst audio feature 710 may use encoder 750 to extract non-transcript specific characteristics of the speaker of the utterances. This way, the two sets of input data from ASR 705 and audio feature extractor 710 may compensate each other to provide more comprehensive information for language understanding module 720 to make accurate predictions of intents and slot labels. Similarly, SLU 700 may include optional synchronizer 715 for alignment of the two sets of input data, as needed.

Figure 8:
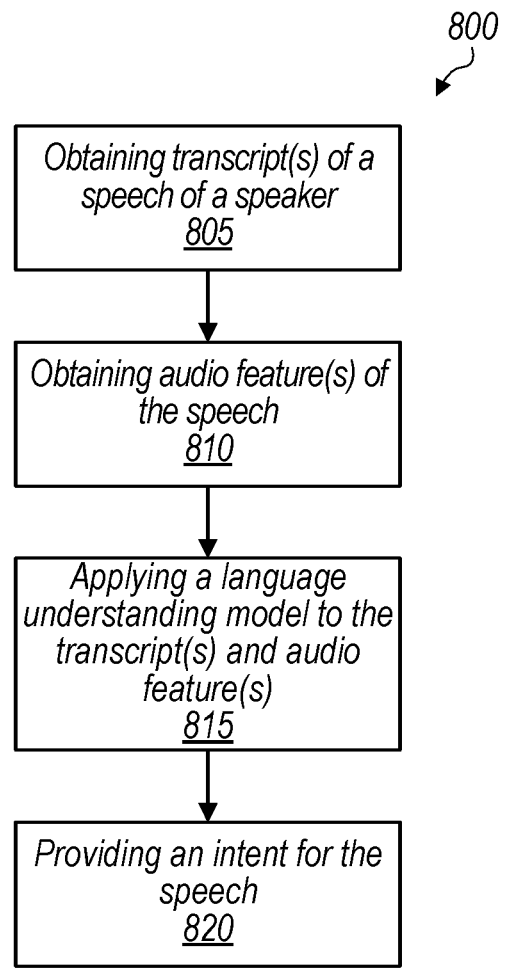
FIG. 8 is a flowchart showing an example operation to perform spoken language understanding, according to some embodiments.

FIG. 8 shows an example operation to perform spoken language understanding, according to some embodiments. In FIG. 8, operation 800 may start with obtaining one or more transcript(s) of a speech of a speaker (block 805). The speech may include one or more utterances, each representing a sentence or sequence of words that begins and ends with a pause. Based on the speech, the one or more transcripts may be created, e.g., by an ASR (e.g., ASR 105/200/605/705 in FIGS. 1-7), as described above. In some embodiments, operation 800 may further include obtaining one or more audio features of the speech (block 810). For instance, the one or more audio features may be created by an audio feature extractor (e.g., audio feature extractor 110/400/610/710 in FIGS. 1-7) as described above. In some embodiments, the one or more audio features may include non-transcript specific characteristics associated with the utterances, e.g., the emotion, tone, pitch, etc. of the speaker in one or more portions of the utterances which may be ignored by the ASR not be captured in the transcripts. Operation 800 may apply a language understanding module (e.g., language understanding module 120/500/620/720 in FIGS. 1-7), through an optional synchronizer (e.g., synchronizer 115/615/715 in FIGS. 1-7), as described above, to the one or more transcripts and the one or more audio features to determine one or more intents (and one or more slot labels) for the speech (block 815). Because the transcript(s) and audio feature(s) may focus on capturing different aspects of the speech, the two may compensate each other to improve the quality and reliability of the predictions of the language understanding module. The language understanding model may then provide the intents (and slot labels) as the prediction result (block 820).

Figure 9:
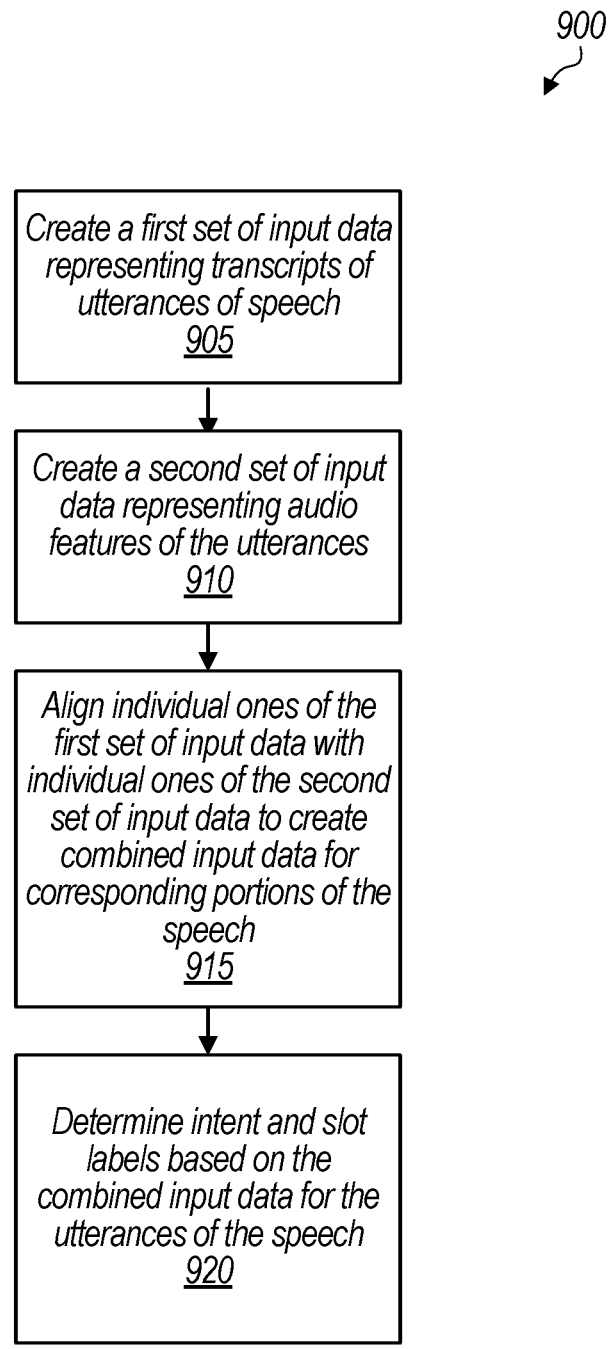
FIG. 9 is a flowchart showing another example operation to perform spoken language understanding, according to some embodiments.

FIG. 9 shows another example operation to perform spoken language understanding, according to some embodiments. In FIG. 9, operation 900 may create a first set of input data based on utterances of speech to represent transcripts of the utterances (block 905). As described, the first set of input data may be created by using an ASR (e.g., ASR 105/200/605/705 in FIGS. 1-7). In some embodiments, operation 900 may create a second set of input data based on the utterances to represent audio features of the utterances (block 910). As described, the first set of input data may be created by using an audio feature extractor (e.g., audio feature extractor 110/400/610/710 in FIGS. 1-7). In some embodiments, the audio features may comprise non-transcript specific characteristics associated with the speaker of the utterances. In some embodiments, operation 900 may align the two sets of input data to produce combined input data (block 915). For instance, a synchronizer (e.g., synchronizer 115/615/715 in FIGS. 1-7) may align individual ones of the first set of input data with individual ones of the second set of input data (e.g., word-by-word or sentence-by-sentence), and concatenate the aligned input data to create combined input data for corresponding portions (e.g., words or sentences) of the speech. Based on the combined input data, a language understanding module (e.g., language understanding module 120/500/620/720 in FIGS. 1-7) may predict intents and slot labels associated with the intents for the utterances.

In some embodiments, operation 900 may not have to include the alignment (block 915). Instead, operation 900 may just feed the two sets of input data separately to the language understanding module. For instance, operation 900 may provide the first set of input data to the language understanding module to make coarse predictions of the intents and slot labels. Operation 900 may further provide the second set of input data to the language understanding module to modify or fine-tune the coarse predictions to determine the final intents and slot labels for the utterances.

Figure 10:
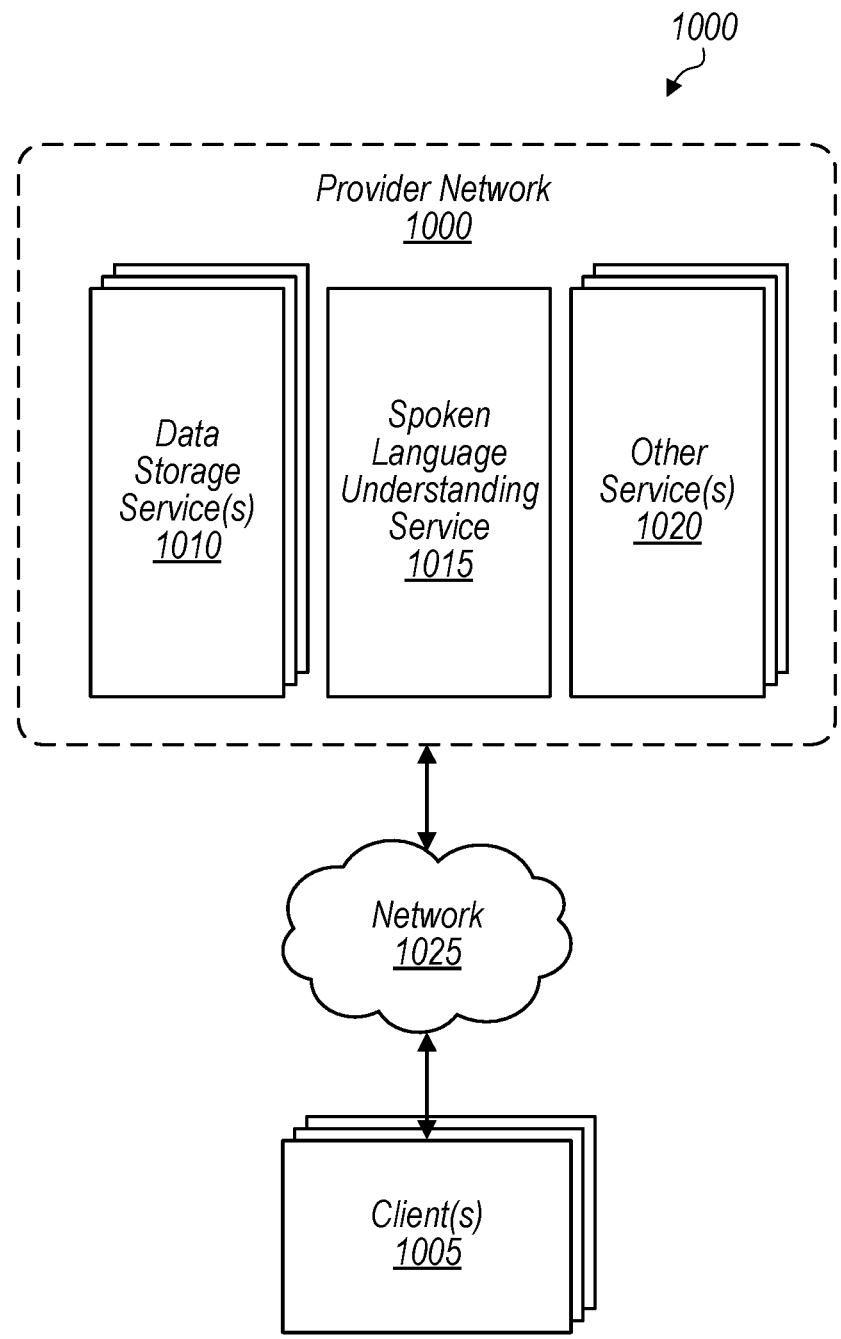
FIG. 10 is a block diagram showing an example provider network for providing spoken language understanding as a network-based service, according to some embodiments.

FIG. 10 shows providing spoken language understanding service as part of a provider network service, according to some embodiments. In FIG. 10, provider network 1000 may be a private or closed system or may be set up by an entity such as a company or a public sector organization to provide one or more services (such as various types of cloud-based storage) accessible via the Internet and/or other networks to one or more client(s) 1005. Provider network 1000 may be implemented in a single location or may include numerous data centers hosting various resource pools, such as collections of physical and/or virtualized computer servers, storage devices, networking equipment and the like (e.g., computing system 1100 described below with regard to FIG. 11), needed to implement and distribute the infrastructure and storage services offered by provider network 1000. In some embodiments, provider network 1000 may implement various computing resources or services, such as a data storage service(s) 1010 (e.g., object storage services, block-based storage services, or data warehouse storage services), spoken language understanding service 1015, as well as other service(s) 1020, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 1010 may implement different types of data stores for storing, accessing, and managing data on behalf of client(s) 1005 as a network-based service that enables one or more client(s) 1005 to operate a data storage system in a cloud or network computing environment. For example, data storage service(s) 1010 may include various types of database storage services (both relational and non-relational) or data warehouses for storing, querying, and updating data. Such services may be enterprise-class database systems that are scalable and extensible. Queries may be directed to a database or data warehouse in data storage service(s) 1010 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 1010 may also include various kinds of object or file data stores for putting, updating, and getting data objects or files, which may include data files of unknown file type. Such data storage service(s) 1010 may be accessed via programmatic interfaces (e.g., APIs) or graphical user interfaces. Data storage service(s) 1010 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, spoken language understanding service 1015 may be provided by provider network 1000 as a network-based service for applications involving spoken language analysis. In some embodiments, spoken language understanding service 1015 may store various components of a SLU system, e.g., the ASR, audio feature extractor, synchronizer and language understanding module described above in FIGS. 1-9. Client(s) 1005 may submit utterances of speech to spoken language understanding service 1015 through network 1025. In response, spoken language understanding service 1015 may return predicted intents and/or slot labels for client(s) 1005. In some embodiments, spoken language understanding service 1015 may identify and provide one or more of the stored components of a SLU system in response to received requests from client(s) 1005. Client(s) 1005 may use the provided components to construct customer SLU systems. The components may have been trained to enable client(s) 1005 to use the customer SLU systems directly without further training. Alternatively, the components may be provided as primitive models to allow client(s) to train them with customer training datasets. In some embodiments, the constructed SLU system may be part of a dialog-controlled system, and the predicted intents and slot labels may be provided to other downstream functional components of the dialog-controlled system to fulfill various action that client(s) 1005 would like to perform. For instance, client(s) 1005 may use spoken language understanding service 1015 to construct a SLU system to reserve flight tickets or purchase pizza. With the constructed SLU system, client(s) 1005 may provide commands through speech based on which the constructed SLU system may determine the intents and slot labels of client(s) 1005. The constructed SLU system may use the predicted intents and slot labels to invoke an online flight ticket reservation or pizza purchase service, e.g., by visiting an airline or pizza store website through an application programming interface (API).

Other service(s) 1020 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 1010. Various other distributed processing architectures and techniques may be implemented by data processing services (e.g., grid computing, sharding, distributed hashing, etc.). Note that in some embodiments, data processing operations may be implemented as part of data storage service(s) 1010 (e.g., query engines processing requests for specified data).

Generally speaking, client(s) 1005 may encompass any type of client configurable to submit network-based requests to provider network 1000 via network 1025, including requests for storage services (e.g., a request to create, read, write, obtain, or modify data in data storage service(s) 1010, a request to perform applications involving spoken language analysis at spoken language understanding service 1015, etc.). For example, a given client 1005 may include a suitable version of a web browser, or may include a plug-in module or other type of code module configured to execute as an extension to or within an execution environment provided by a web browser. Alternatively, a client 1005 may encompass an application such as a database application (or user interface thereof), a media application, an office application or any other application that may make use of storage resources in data storage service(s) 1010 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 1005 may be an application configured to interact directly with provider network 1000. In some embodiments, client(s) 1005 may be configured to generate network-based services requests according to a Representational State Transfer (REST)-style network-based services architecture, a document- or message-based network-based services architecture, or another suitable network-based services architecture.

In various embodiments, network 1025 may encompass any suitable combination of networking hardware and protocols necessary to establish network-based-based communications between client(s) 1005 and provider network 1000. For example, network 1025 may generally encompass the various telecommunications networks and service providers that collectively implement the Internet. Network 1025 may also include private networks such as local area networks (LANs) or wide area networks (WANs) as well as public or private wireless networks. For example, both a given client 1005 and provider network 1000 may be respectively provisioned within enterprises having their own internal networks. In such an embodiment, network 1025 may include the hardware (e.g., modems, routers, switches, load balancers, proxy servers, etc.) and software (e.g., protocol stacks, accounting software, firewall/security software, etc.) necessary to establish a networking link between given client 1005 and the Internet as well as between the Internet and provider network 1000. It is noted that in some embodiments, client(s) 1005 may communicate with provider network 1000 using a private network rather than the public Internet.

Figure 11:
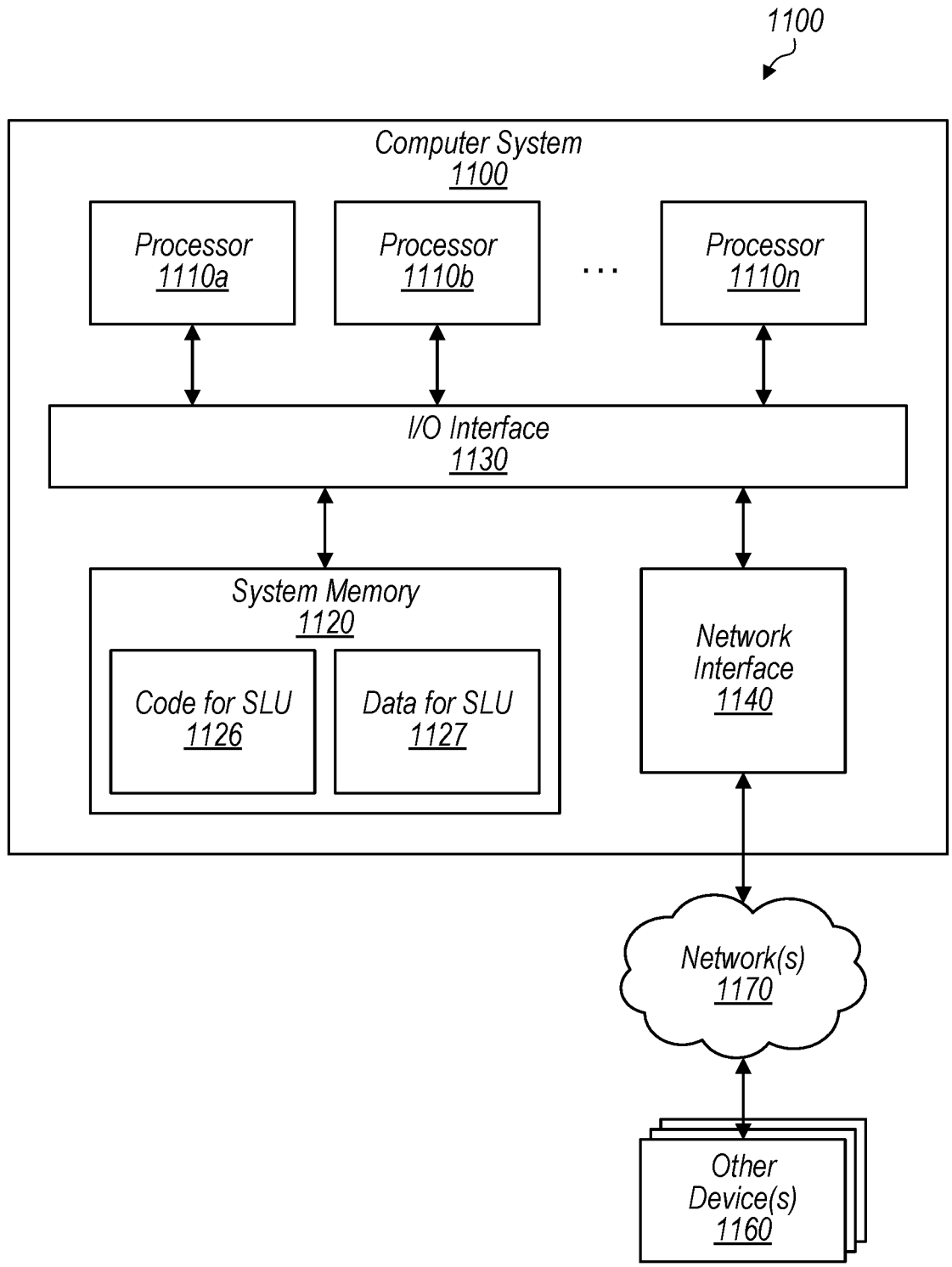
FIG. 11 is a block diagram showing an example computing system to implement the various techniques described herein, according to some embodiments.

FIG. 11 shows an example computing system to implement the various techniques described herein, according to some embodiments. For example, in one embodiment, the SLU system described above in FIGS. 1-10 may be implemented by a computer system, for instance, a computer system as in FIG. 11 that includes one or more processors executing program instructions stored on a computer-readable storage medium coupled to the processors. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be one embodiment of a computer-accessible medium configured to store instructions and data accessible by processor(s) 1110. In various embodiments, system memory 1120 may be implemented using any non-transitory storage media or memory media, such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140. In the illustrated embodiment, program instructions (e.g., code) and data implementing one or more desired functions, such as the SLU system described above in FIGS. 1-10, are shown stored within system memory 1130 as code 1126 and data 1127.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fiber Channel SANs, or via any other suitable type of network and/or protocol.

In some embodiments, system memory 1120 may be one embodiment of a computer-accessible medium configured to store program instructions and data as described above for FIG. 1-10. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computing devices configured to implement a spoken language understanding system, wherein the spoken language understanding system is configured to:
receive audio data for an utterance of a speaker via an interface for the spoken language understanding system;
apply an automatic speech recognition model to the audio data to produce data representing one or more transcripts of the utterance of the speaker;
extract one or more audio features of the utterance of the speaker from the audio data to generate data representing the audio features; and
apply a language understanding model to determine an intent and at least one slot label associated with the intent for the utterance of the speaker by providing the data representing the one or more transcripts and the data representing the one or more audio features as input to a common encoder of the language understanding model concurrently, wherein the language understanding model is trained using both transcript input data and audio feature input data.

2. The system of claim 1, wherein the one or more audio features comprise non-transcript specific characteristics associated with the utterance.

3. The system of claim 1, wherein the spoken language understanding system is further configured to:
align the data representing the one or more transcripts with the data representing the one or more audio features corresponding to one or more same portions of the utterance of the speaker; and
apply the language understanding model using the aligned data representing the transcripts and the audio features as the input to determine the intent and the at least one slot label.

4. The system of claim 1, wherein the spoken language understanding system is implemented as part of a spoken language understanding service offered by a provider network, wherein the the interface is a network-based interface of the spoken language understanding service, and wherein the audio data are stored in one or more storage resources that are implemented as part of a data storage service offered by the provider network.

5. A method, comprising:
determining, by a spoken language understanding system, an intent for an utterance of a speaker from audio data, wherein the determining comprises:

obtaining data representing one or more transcripts of the utterance;

obtaining data representing one or more audio features of the utterance;

applying a language understanding model to determine the intent for the utterance by providing the data representing the one or more transcripts and the data representing the one or more audio features as input to a common encoder of the language understanding model concurrently, wherein the language understanding model is trained using both transcript input data and audio feature input data; and providing, by the spoken understanding model, the intent for the utterance.

6. The method of claim 5, wherein the one or more audio features comprise non-transcript specific characteristics associated with the utterance.

7. The method of claim 5, further comprising:

synchronizing the data representing the one or more transcripts with the data representing the one or more audio features corresponding to one or more same portions of the utterance of the speaker; and applying the language understanding model to the synchronized data representing the transcripts and the audio features to determine the intent for the utterance of the speaker.

8. The method of claim 7, wherein the synchronizing comprises:

assigning a first set of tokens associated with the data representing the one or more transcripts and a second set of tokens associated with the data representing the one or more audio features; and synchronizing the data representing the one or more transcripts with the data representing the one or more audio features based on the first and second sets of tokens associated respectively with the transcripts and audio features.

9. The method of claim 7, wherein the applying comprises:

concatenating the synchronized data representing the transcripts and the audio features to produce combined data; and applying the language understanding model to the combined data to determine the intent for the utterance.

10. The method of claim 5, wherein the applying comprises:

applying the language understanding model to the data representing the one or more transcripts to determine a coarse intent for the utterance; and applying the language understanding model to the data representing the one or more audio features to adjust the coarse intent to determine the intent for the utterance.

11. The method of claim 5, wherein the method further comprises:

applying the language understanding model to the data representing the one or more transcripts and the data representing the one or more audio features to determine at least one slot label associated with the intent for the utterance.

12. The method of claim 5, wherein the spoken language understanding system is implemented as part of a spoken language understanding service offered by a provider network, and wherein the audio data are received via a network-based interface for the spoken language understanding service and stored in one or more storage resources that are implemented as part of a data storage service offered by the provider network.

13. One or more non-transitory, computer readable media, storing program instructions that when executed on or across one or more computing devices, cause the one or more computing devices to implement:

obtaining a first set of data representing one or more transcripts of an utterance of a speaker from audio data;

obtaining a second set of data representing one or more audio features of the utterance from the audio data;

applying a language understanding model to determine an intent for the utterance by providing the first and second sets of data as input to an encoder of the language understanding model concurrently, wherein the language understanding model is trained using both transcript-related training data and audio feature-related training data.

14. The one or more non-transitory, computer readable media, of claim 13, wherein the audio features comprise non-transcript specific characteristics associated with the utterance.

15. The one or more non-transitory, computer readable media, of claim 13, further storing program instructions that when executed on or across the one or more computing devices, cause the one or more computing devices to implement:

synchronizing the first set of data with the second set of data corresponding to one or more same portions of the utterance of the speaker; and applying the language understanding model to the synchronized first and second sets of data to determine the intent for the utterance of the speaker.

16. The one or more non-transitory, computer readable media, of claim 15, wherein the synchronizing comprises:

assigning a first set of tokens associated with the first set of data and a second set of tokens associated with the second set of data; and synchronizing the first and second sets of data based on the first and second sets of tokens associated respectively with the first and second sets of data.

17. The one or more non-transitory, computer readable media, of claim 15, wherein the applying comprises:

concatenating the synchronized first and second sets of data to produce combined data; and applying the language understanding model to the combined data to determine the intent for the utterance.

18. The one or more non-transitory, computer readable media, of claim 13, wherein the applying comprises:

applying the language understanding model to the first set of data to determine a coarse intent for the utterance; and applying the language understanding model to the second set of data to adjust the coarse intent to determine the intent for the utterance.

19. The one or more non-transitory, computer readable media, of claim 13, further storing program instructions that when executed on or across the one or more computing devices, cause the one or more computing devices to implement:

applying the language understanding model to the first and second sets of data to determine at least one slot label associated with the intent for the utterance.

20. The one or more non-transitory, computer readable media, of claim 13, wherein the spoken language understanding system is implemented as part of a spoken language understanding service offered by a provider network, and wherein the audio data are received via a network-based interface for the spoken language understanding service and stored in one or more storage resources that are implemented as part of a data storage service offered by the provider network.

* * * * *